United States Patent [19]
Iritani et al.

[11] Patent Number: 6,077,546
[45] Date of Patent: *Jun. 20, 2000

[54] QUICK-FERMENTED FEED AND METHOD OF PREPARING

[75] Inventors: Satoshi Iritani; Yoshinori Sato; Hiroto Chaen; Toshio Miyake, all of Okayama, Japan

[73] Assignee: Kabushiki Kaisha Hayashibara Seibutsu, Okayama, Japan

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/667,937

[22] Filed: Jun. 24, 1996

[30] Foreign Application Priority Data

Jun. 26, 1995 [JP] Japan ................................. 7-180560

[51] Int. Cl.⁷ ........................................ A23K 1/18
[52] U.S. Cl. ................... 426/2; 426/53; 426/61; 426/623; 426/630; 426/635; 426/636
[58] Field of Search .................. 426/2, 53, 61, 426/635, 807, 623, 630, 636; 435/252.1, 252.9, 253.4

[56] References Cited

U.S. PATENT DOCUMENTS 5,371,011  12/1994  Bernier et al. ............................ 426/53
5,545,418   8/1996  Iritani et al. ............................. 426/53
5,547,692   8/1996  Iritani et al. ............................. 426/53

FOREIGN PATENT DOCUMENTS 1571855  7/1990  United Kingdom .
2284972  6/1995  United Kingdom .
2285806  7/1995  United Kingdom .
9403646  2/1994  WIPO .

OTHER PUBLICATIONS

"Dietary Fiber", pp. 38 to 45 (1982), published by Dai–ichi Shuppan Co., Ltd., Tokyo, Japan.

Biseibutsu–no–Bunrui–to–Doutei (Classification and Identification of Microorganism) (Edited by Hasegawa, Gakujyutsu Shutsupan Center, 1985).

M.J. Playne, Increased Digestibility of Bagasse by Pretreatment with Alkalis and Steam Explosion, Biotechnology and Bioengineering, vol. 26, pp. 426–433 (1984).

Peter H. A. Sneath et al, Bergey's Manual Of Systematic Bacteriology, vol. 2, pp. 1063–1065.

E. Molina et al, Nutritive Value For Ruminants Of Sugar Cane Bagasse Enslied After Spray Treatment With Different Levels Of Sodium Hydroxide, Animal Feed Science and Technology, vol. 9, pp. 1–17, (1983).

Primary Examiner—Arthur L. Corbin
Attorney, Agent, or Firm—Browdy and Neimark

[57] ABSTRACT

A quick-fermented feed is prepared by incorporating plant concentrate materials into alkali-treated wastes of agricultural products to lower the pH to a level below 10, inoculating the mixture with lactic acid bacteria capable of growing under alkaline conditions or high salt conditions, and fermenting the resulting mixture.

9 Claims, No Drawings

QUICK-FERMENTED FEED AND METHOD OF PREPARING

BACKGROUND OF THE INVENTION

1. Field of the Invention

The present invention relates to a quick-fermented feed, its preparation and uses, more particularly, to a quick-fermented feed obtained by incorporating a plant concentrate material into an alkali-treated agricultural product waste to lower the pH to a level below 10, inoculating a lactic acid bacterium into the mixture, and fermenting the resulting mixture, and to its preparation and uses.

2. Description of the Prior Art

Wastes of agricultural products which are rich in cellulose and hemicellulose such as bagasse, ears and stems of corn, trunks of koaliang, rice hulls, rice straws, wheat and barley straws, shells of peanuts, barks, blocks and chips of woods, bamboos, and bamboo grasses can be used as a fuel. However, there is no other beneficial use. At least several hundreds million tons of such wastes are produced yearly all over the world, and this results in a problem for treating these wastes.

Unlike humans, pigs and poultry with a simple stomach, ruminants such as cattle and sheep which feed on grass ingest plants' cellulose and hemicellulose to generate energy, and inherently and physiologically require them as roughage.

Increasing consumption of livestock products such as beef and dairy products resulted in a remarkable progress in the diversified livestock-farming. As a result, an intensive livestock-farming has been developed to breed many cattle in a restricted small area or in a small shed while forcing them to stand in the same location, and this results in a problem of supplying sufficient feed grasses and in an urgent demand for roughages containing cellulose and hemicellulose which can be substituted for feed grasses.

There have long been conducted many trials to utilize wastes of agricultural products as roughages. However, these wastes contain a relatively large amount of lignin, which are tightly linked together with fibers such as cellulose so that even ruminants cannot assimilate them well, and the wastes have an unsatisfactory taste and a relatively poor nutritive value.

To improve the nutritive value of these wastes of agricultural products, there are many proposals to increase their digestibility by decomposing lignin to soften their texture. In the case of bagasse, it is treated with an alkaline reagent, then fermented. In such an alkaline treatment, as described in "*Biotechnology and Bioengineering*", Vol.26, pp.426–433 (1984), sodium hydroxide, calcium hydroxide and sodium carbonate are known as alkaline reagents. In the fermentation of an alkali-treated bagasse, for instance, as described in "*Animal Feed Science and Technology*", Vol.9, pp.1–17 (1983), an ensilage of an alkali-treated bagasse using sodium hydroxide is known.

SUMMARY OF THE INVENTION

The present invention provides high quality quick-fermented feeds, which are prepared from wastes of agricultural products and plant concentrate materials and overcome the above drawbacks, and uses thereof. Considering the vast demand for such quick-fermented feeds, the present invention was made to provide an easy process for preparing such feeds in large scale production at a relatively low cost and in a relatively short period of time.

To overcome the above object, the present inventors energetically studied lactic acid bacteria which grow in nutrient culture media containing alkali-treated wastes of agricultural products and which have a relatively high pH and concentration of salts. As a result, they found that satisfactorily high quality fermented feeds are readily prepared from alkali-treated wastes of agricultural products in a relatively short period of time by incorporating plant concentrate materials into the alkali-treated wastes to lower the pH to a level below 10, inoculating the above lactic acid bacteria into the mixtures, and fermenting the resulting mixtures. Thus, they accomplished this invention.

The present inventors energetically studied the aforesaid conventional methods and found that the alkaline treatment with sodium hydroxide relatively moderately lowers the pH of alkali-treated bagasses, i.e. it takes a relatively long period of time to lower their pH to a level at which lactic acid bacteria can grow, and requires 25–90 days to complete the production of fermented bagasse feeds. To shorten this preparation period, alkali-treated bagasses should be neutralized with acid solutions to rapidly lower their pH. It was also found that only a small amount of sodium hydroxide with a strong alkalinity is needed to keep the alkali-treating system at a considerably-high pH level, but as a drawback it hydrolyzes lignin, softens the texture of bagasse, and readily decomposes and diminishes the amount of cellulose and hemicellulose in the bagasse as valuable ingredients for roughage.

It was found that calcium hydroxide and sodium carbonate with a relatively low alkalinity should be used in an amount of about 12–30 w/w % of bagasse, on a dry solid basis (the wordings of "w/w %" and "on a dry solid basis" as referred to the present invention will be respectively abbreviated as "%" and "d.s.b." hereinafter, unless specified otherwise), and this increases the production cost of alkali-treated bagasses, and obliges ruminants to ingest an excessive amount of alkalis. Therefore, the ruminants require much water and excrete more urine. This is a fatal drawback because it is a physiological load for the ruminants.

Concentrated materials rich in proteins and amylaceous substances, more particularly, plant concentrate materials such as rice bran, defatted soybean, and pressed corn are known to have quantities of phytin which in itself limit the utilization and absorption of phosphorous, and inhibit the absorption of essential minerals such as calcium, iron, copper, zinc and cobalt, thus reducing the nutritive value of the concentrate materials. It has been expected to establish a high quality feed which is prepared by hydrolyzing phytin to improve the utility of phosphorous and to promote the essential minerals' absorption.

The present invention comprises incorporating plant concentrate materials into alkali-treated wastes of agricultural products to lower the pH to a level below 10, inoculating lactic acid bacteria which can grow in nutrient culture media with a pH of over 9.5 or with 6.5% sodium chloride, preferably, those of the genus Enterococcus, and fermenting the mixture. This invention has the characteristics below:

(1) Because the pH of alkali-treated wastes of agricultural products can be lowered by incorporating plant concentrate materials into the wastes up to a pH below 10, preferably, a pH below 9.7, an earlier inoculation of lactic acid bacteria, which can grow at pHs of 9.5 or more, and a smooth lactic acid fermentation are feasible;

(2) The lactic acid bacteria can grow in 6.5% sodium chloride solution so that alkaline reagents used to produce alkali-treated wastes of agricultural products are not restricted to sodium hydroxide, so that the present object is attained with only a small amount of sodium oxide, calcium hydroxide and sodium carbonate are used in a relatively large amount, and the later described calcium oxide either with or without sodium hydroxide can be used selectively;

(3) Phytin in the plant concentrate materials is decomposed into a phosphorous source which accelerates the absorption of essential minerals such as calcium, iron, copper, zinc, and cobalt in the materials; and (4) The process of the present invention is suitable for an industrial scale production of quick-fermented feeds from alkali-treated wastes of agricultural products because it facilitates the fermentation, shortens the production period, and produces the feeds at a relatively low cost.

The present inventors found that in the alkaline treatment of wastes of agricultural products the use of calcium oxide either with or without sodium hydroxide as alkaline reagents is suitable for the production of alkali-treated wastes of agricultural products and quick-fermented feeds prepared therefrom, and they accomplished this invention. The inventors found that the use of calcium oxide either with or without sodium hydroxide as alkaline reagents has the following characteristics:

(1) It produces alkali-treated wastes of agricultural products with softened texture and minimal decomposition of cellulose and hemicellulose as the effective ingredients;

(2) It reduces the amount of alkaline reagents used by a large margin and attains the alkaline treatment in a relatively short period of time because, as an assumption, calcium oxide is an active alkaline reagent and absorbs water to promote the alkaline reaction;

(3) It enables an earlier inoculation of lactic acid bacteria because the pH of alkali-treated wastes of agricultural products is relatively quickly lowered and positively decreased by incorporating plant concentrate materials;

(4) Because the technique in itself is relatively easy and shortens the production period, it is suitable for producing alkali-treated wastes of agricultural products and quick-fermented feeds prepared therefrom on an industrial scale;

(5) The ratio of alkali reagents to wastes of agricultural products is relatively low, and there is no anxiety about ruminants' excessive intake of alkaline reagents, especially, sodium hydroxide. From a nutritional view point, it has a satisfactory feature that the final products are appropriately enriched with calcium as an essential mineral; and (6) The quick-fermented feeds thus obtained have a satisfactorily-high quality, assimilability and taste preference.

DETAILED DESCRIPTION OF THE INVENTION

The alkali-treated wastes of agricultural products used in the present invention are usually produced as follows: The wastes of agricultural products used in the present invention include those which are produced from farms and processing factories and have a moisture content of about 40–90%. The wastes can be used intact and, if necessary, can be dried and stored, prior to use. The preferable minimum humidity required for the present alkaline treatment is a water content which allows the wastes and alkaline reagents to mix sufficiently, while the preferable maximum is a water content which does not allow alkaline solutions to exude from the resulting alkali-treated wastes. Water contents of about 40–90%, preferably, about 45–80% are recommended.

In the case of using calcium oxide as an alkaline reagent, active calcium oxide or fresh calcium oxide which are substantially free of moisture as much as possible should be used. Those in the form of a granule or a powder can be used. The amount of calcium oxide is not higher than 5%, preferably, 2–4% of the wastes, d.s.b. The amount of sodium hydroxide suitably used with calcium oxide is not greater than that of calcium oxide, preferably, less than 3% of the wastes, d.s.b.

Any method can be used in the present invention as long as it adds a prescribed amount of moisture to wastes of agricultural products and mixes the moistened wastes with alkaline reagents: For example, the wastes may be successively mixed with water and alkaline reagents and vice versa. Usually, these mixing steps are carried out at ambient temperatures of about 10–35° C.

The initial pHs of the wastes with alkaline reagents thus obtained are usually over about 10.3, preferably, pHs of about 10.5–12, and the objective alkali-treated wastes of agricultural products are readily obtainable by merely allowing the wastes to stand at ambient temperature.

The alkali-treated wastes of agricultural products, prepared with calcium oxide as an alkaline reagent, have a satisfactorily softened texture and insubstantial loss of cellulose and hemicellulose, more particularly, those obtained with a combination of calcium oxide and sodium hydroxide have more decomposed lignin and more softened texture than those prepared with only calcium oxide, as well as having insubstantial loss of cellulose and hemicellulose. Therefore, these alkali-treated wastes are suitably used as materials for the present quick-fermented feeds.

The pH of the alkali-treated wastes of agricultural products to produce the present quick-fermented feeds is lowered to a pH below 10, preferably, a pH below 9.7 by incorporating plant concentrate materials into the wastes. In the alkaline treatment, the aforesaid calcium oxide can be used with one or more other conventionally known alkaline reagents such as sodium hydroxide, calcium hydroxide and sodium carbonate which cannot readily lower the pH of the wastes.

The present quick-fermented feeds can be prepared from alkali-treated wastes of agricultural products by incorporating plant concentrate materials into the alkali-treated wastes with a pH of not less than 10, preferably, a pH of 10.5–12, to positively lower the pH to a level below 10, preferably, a level below 9.7, inoculating lactic acid bacteria into the mixtures, and fermenting the resulting mixtures. In this case, the plant concentrate materials can be previously incorporated into the alkali-treated wastes to lower the pH to a prescribed level, then the lactic acid bacteria are inoculated into the mixtures, followed by fermenting the resulting mixtures. Mixtures of the plant concentrate materials and lactic acid bacteria can be incorporated into the alkali-treated wastes to lower the pH and to initiate a lactic acid fermentation.

The lactic acid bacteria suitably used in the present invention include those which ferment in alkaline nutrient culture media with a pH over 7, preferably, a pH over 9.5. More preferably, those of the genus Enterococcus are suitably used in the invention. Especially, a newly isolated microorganism of the genus Enterococcus, i.e. *Enterococcus*

*faecium* HL-5 (FERM BP-4504), disclosed in the present invention, which grows in high alkaline conditions of pHs over 9.5 or in 6.5% sodium chloride solution, and produces lactic acid to lower the pH of mixtures of alkali-treated wastes of agricultural products and plant concentrate materials, resulting in high quality fermented feeds with a satisfactory taste preference in a relatively short period of time. The microorganism is advantageously used to produce high-quality quick-fermented feeds because it has a phytase activity to decompose phytin contained in plant concentrate materials.

As is described above, the process of the present invention positively lowers the pH of wastes of agricultural products to a level below 10, preferably, to a level below 9.7, more preferably, to a level over 7 but below 9.7 by incorporating plant concentrate materials into the wastes to enable an earlier inoculation of lactic acid bacteria, which facilitates the following lactic acid fermentation, and shortens the production period of fermented feeds to about 2–4 days. The above mentioned microorganism is advantageously inoculated into alkali-treated wastes of agricultural products, prepared with calcium oxide which relatively quickly lowers the pH of the alkali-treated wastes, to effectively shorten the production period for fermented feeds.

The results of the identification test of the microorganism Enterococcus HL-5 strain, newly isolated from an ensiled corn by the present inventors, are given below, and the identification study was conducted in accordance with "*Biseibutsu-no-Bunrui-to-Doutei*" (Classification and Identification of Microorganism), edited by Takeji Hasegawa, Gakujutsu-Shuppan-Center, Tokyo, Japan (1985):

A. Morphology
   (1) Characteristics of cells when incubated at 37° C. in MRS agar Usually existing in a coccus form of 0.9–1.2 µm; Existing in a coupled- or linked-form; Motility: Negative; Asporogenicity: None; and Gram stain: Positive.
   (2) Characteristics of cells when incubated at 37° C. in PG agar Usually existing in a coccus form of 0.9–1.2 µm; Existing in a coupled- or linked-form; Motility: Negative; Asporogenicity: None; and Gram stain: Positive.

B. Cultural Properties
   (1) Characteristics of colony formed when incubated at 37° C. in MRS agar plate Shape: Circular colony having a diameter of about 1–2 mm after 3 days incubation; Rim: Entire; Projection: Hemispherical shape; Gloss: Wettish gloss; Surface: Smooth; and Color: Milk white and semitransparent.
   (2) Not liquefying MRS gelatin when stab cultured at 37° C.
   (3) Forming acid and gelatinizing litmus milk when incubated at 37° C.

C. Physiological Properties
   (1) Catalase: Negative
   (2) Oxidase: Negative
   (3) Liquefaction of gelatin: Negative
   (4) Hydrolysis of casein: Negative
   (5) Hydrolysis of arginine: Positive
   (6) Tolerance to 40% bile: Positive
   (7) Hemolysis: Negative
   (8) Hydrolysis of hippurate: Positive
   (9) Hydrolysis of aesculin: Positive
   (10) Growth at 10° to 45° C.: Positive
   (11) Growth at pH 9.6: Positive
   (12) Growth in 6.5% NaCl: Positive
   (13) Oxygen requirements: Facultative anaerobic
   (14) Acid formation from carbon source Amygdalin: Positive Arabinose: Positive Cellobiose: Positive Aesculin: Positive Fructose: Positive Galactose: Positive Glucose: Positive Gluconic acid: Positive Lactose: Positive Maltose: Positive Mannitol: Positive Mannose: Positive Melezitose: Negative Melibiose: Positive Raffinose: Positive Rhamnose: Positive Ribose: Positive Salicin: Positive Sorbitol: Negative Sucrose: Positive Trehalose: Positive Xylose: Negative Arbutin: Positive Sorbose: Negative
   (15) Main diamino acid of cell walls: Lysine
   (16) Mol% glycine (G) plus cytosine (C): 38.6%

The above bacteriological properties were compared with known microorganisms with reference to "*Bergey's Manual of Systematic Bacteriology*", Vol.2 (1986). As a result, based on the above properties, it was revealed that the microorganism was identified with a microorganism of the species of *Enterococcus faecium* except for a property of negative acid-forming ability from sorbose.

From the above results, the present inventors named this novel microorganism *Enterococcus faecium* HL-5 and, on the date of Dec. 17, 1993, deposited in the National Institute of Bioscience and Human-Technology Agency of Industrial Science and Technology placed at 1–3, Higashi 1-chome, Tsukuba-shi, Ibaraki, Japan, and it was accepted under the deposit number of FERM BP-4504. In the present invention, in addition to the microorganism, other microorganisms of the genus Enterococcus, which proliferate in alkaline media having a pH of not less than 9.5 and containing an alkali-treated waste of agricultural product or in alkaline media containing 6.5% sodium chloride, and their mutants can be selectively used. Other microorganisms of the genus Enterococcus usable in the present invention include, for instance, *Enterococcus casseliflavus* IFO 3531, *Enterococcus durans* IFO 13131, *Enterococcus faecalis* IFO 3791, *Enterococcus faecium* IFO 3535 and *Enterococcus hirae* IFO 3181T.

It was found that, similar to *Enterococcus faecium* HL-5 strain isolated by the present inventors, lactic acid bacteria of the genus Enterococcus can be suitably used to shorten the fermentation period because they can proliferate in a relatively early stage of the pH reduction of alkali-treated wastes of agricultural products or in alkaline conditions of not less than pH 9, preferably, not less than pH 9.5, can be inoculated into the alkali-treated wastes at an earlier stage.

A combination of a lactic acid bacterium of the genus Enterococcus and one or more microorganisms selected from the group consisting of lactic acid bacteria of the genera Lactobacillus, Pediococcus and Streptococcus which proliferate at pHs below about 8, is most advantageously used for producing high-quality quick-fermented feeds with a satisfactory taste.

The microorganisms of the genus Lactobacillus used in the present invention include, for example, *Lactobacillus rhamnosus* IFO 3532, *Lactobacillus plantarum* IFO 3070, *Lactobacillus sake* IFO 3541, *Lactobacillus acidophilus* IFO 13952, *Lactobacillus helveticus* IFO 3809 and *Lactobacillus brevis* IFO 3345, and a combination of one or more of these microorganisms are suitably used to improve the taste preference of the objective quick-fermented feeds.

Furthermore, microorganisms of the genera Pediococcus and Streptococcus such as *Pediococcus acidilactici* IFO 3076 and *Streptococcus bovis* IFO 12057 can be advantageously used.

Any fermentation treatment of alkali-treated wastes of agricultural products can be used in the present invention as long as it can incorporate plant concentrate materials into the alkali-treated wastes, inoculate the mixtures with lactic acid bacteria, and ferment the resulting mixtures. Usually, the present object is attained by mixing the alkali-treated wastes with the plant concentrate materials and optionally an adequate amount of water, inoculating seed cultures of lactic acid bacteria into the mixtures, and fermenting the resulting mixtures at ambient temperature for about 2–4 days, preferably, at temperatures of about 15–50° C. under anaerobic conditions for about 2–4 days while the mixtures are covered with sheets, placed into flexible bags, or lapped with adequate materials.

The plant concentrate materials suitably used in the present invention include those which are rich in phytin because they have a strong pH-controllability and can be advantageously used as agents to lower the pH of alkali-treated wastes of agricultural products with a pH of 10 or more: For example, crushed cereals such as pressed and ground cereals, wheat brans, and low grade flour; brans such as rice bran, wheat bran, and millet bran; and lees or meals such as defatted soybean, lees of bean curd, corn gluten meal, lees of fermented corn, rapeseed meal, sesame meal, peanut meal, cotton seed meal, and sunflower meal are suitably used. If necessary, the present quick-fermented feeds can be prepared from a combination of the alkali-treated wastes of agricultural products, plant concentrate materials, and one or more materials consisting of by-products in the milk product industry such as skim milk powder, milk casein, and whey; animal concentrate materials such as fish meal, blood meal, and feather meal; saccharides such as molasses, sugar, glucose, maltose, and lactose; minerals such as bone meal, calcium salts, magnesium salts, sodium salts, phosphates, iron salts, copper salts, zinc salts, and cobalt salts; and vitamins such as water-soluble and lipid-soluble vitamins.

In the present quick-fermented feeds prepared from plant concentrate materials containing large quantities of phytin such as crushed cereals, as well as cereal brans, lees and meals, phytin in the feeds is well decomposed into a readily absorbable and utilizable phosphorous source to accelerate the absorption of essential minerals such as calcium, iron, copper, zinc and cobalt in the feeds. Thus the present quick-ferment feeds are advantageously used as feeds for ruminants and other animals which have simple stomachs.

The ratio of plant concentrate materials to alkali-treated wastes of agricultural products should be a level which is enough to lower the pH of the alkali-treated wastes to a level below 10, which allows a sufficient growth of lactic acid bacteria, preferably, a pH of over 7 but below 9.7. Usually, the percentage of the plant concentrate materials is over 20%, preferably, over 40% of the alkali-treated wastes, d.s.b. The minimum water content in the lactic acid fermentation is one which allows lactic acid bacteria to ferment, and the maximum water content is one which does not allow nutrient-rich solutions to exude from the resulting quick-fermented feeds. Usually, a preferable water content is about 40–90%, preferably, about 45–80%, more preferably, about 45–60% when an improved storage stability is required. The types and amounts of nutritive sources used in the lactic acid fermentation are selectively changed depending on the objective use of the quick-fermented feeds, i.e. depending on whether they are used as roughages or used as complete feeds with well balanced nutrients. Varying depending on the amounts of nutrients used, most of the quick-fermented feeds thus obtained are acidified with lactic acid and have a relatively long shelf-life and a satisfactory taste. If necessary, to increase the storage stability, they can be dried with air or dried by heating to lower the water content to less than 40%, preferably, less than 30%, then stored until their use.

The present quick-fermented feeds thus obtained are high-quality feeds with a satisfactorily high digestibility and taste. The feeds are mainly used for ruminants and, if necessary, used for animals with simple stomach such as pigs and poultry, more particularly, they can be used as feeds for controlling intestinal conditions, preventing infectious diseases, and preventing unsatisfactory smell of feces. When used as cattle feeds, the feeds are usually administered to cattle at least about 4–20 kg/day/head, varying depending on the types of the feeds and the ages of the cattle, resulting in an increase of their body weight by at least about 2 kg/day/head, preferably, at least about 2.5 kg/day/head.

Prior to use, the quick-fermented feeds according to the present invention can be mixed with other nutrients to meet to the kind and ages of the animals to be fed.

The following experiments explain alkali-treated wastes of agricultural products and their pH reduction by plant concentrate materials:

EXPERIMENT 1
Influence of Alkaline Reagent on Alkaline Treatment

A bagasse was tested as a waste of agricultural product. The bagasse was admixed with water to give a moisture content of 70%, then mixed to homogeneity as much as possible with alkaline reagents, i.e. sodium hydroxide (NaOH) in an amount of 3, 5 or 7% of the bagasse, d.s.b., and calcium oxide (CaO) in an amount of 2, 3, 5 or 7% of the bagasse, d.s.b., followed by allowing to stand the mixture at ambient temperature and studying the changes of pH and components and the flexibility of the resulting alkali-treated bagasse.

The bagasse was measured for pH just before mixing with the alkaline reagents and 24- and 48-hours after the mixing. The measurement of pH was carried out by mixing one part by weight of an alkali-treated bagasse with 2 parts by weight of refined water, allowing the mixture to stand for 10 min, filtering the mixture, and measuring the pH of the filtrate on a pH meter. The measurement of the components was carried out by sampling 8 samples from each of the intact bagasse and the bagasse with 24- or 48-hour alkaline treatment, measuring the contents of cellulose, hemicellulose and lignin, and calculating their mean values.

The above measurement was conducted in accordance with the Van Soest's detergent filter method as described in the chapter 3.1 of "*Dietary Fiber*", pp.38–46 (1982), published by Daiichi-Shutsupan Co., Ltd., Tokyo, Japan. The contents of hemicellulose, cellulose and lignin in the material bagasse were respectively 28.7%, 52.6% and 11.9%, d.s.b.

The flexibility of alkali-treated bagasse was evaluated by touch as clutched by hands wearing thin rubber gloves. The results are shown in Table 1.

TABLE 1

| Alkaline reagent (%) | | O | 24 | | | | | 48 | | | | |
|---|---|---|---|---|---|---|---|---|---|---|---|---|
| | | pH | pH | HC | C | L | F | pH | HC | C | L | F |
| NaOH | 3 | 10.8 | 10.3 | 79.4 | 93.5 | 75.3 | Good | 10.0 | 72.3 | 91.5 | 74.5 | Good |
| | 5 | 11.3 | 10.7 | 65.7 | 88.2 | 72.8 | Good | 10.3 | 59.8 | 85.4 | 71.4 | Good |
| | 7 | 12.4 | 11.5 | 53.6 | 81.3 | 66.4 | Good | 11.0 | 37.7 | 78.6 | 54.6 | Good |
| CaO | 2 | 10.4 | 8.9 | 99.2 | 99.3 | 82.2 | Good | 8.5 | 99.1 | 99.2 | 80.2 | Good |
| | 3 | 10.7 | 9.3 | 98.1 | 99.5 | 80.6 | Good | 8.7 | 98.0 | 98.1 | 79.0 | Good |
| | 5 | 11.2 | 10.4 | 97.4 | 97.4 | 77.5 | Good | 10.0 | 96.1 | 97.3 | 75.6 | Good |
| | 7 | 11.9 | 11.2 | 91.6 | 94.8 | 75.2 | Good | 10.5 | 90.3 | 93.6 | 74.4 | Good |

Note: In Table 1, the symbol "HC" means hemicellulose; "C", cellulose; "L", lignin; and "F", flexibility. The values in "HC", "C" and "L" mean residual percentages (%) of their contents with respect to the material bagasse after the alkaline treatment.

In Table 1, the values in the items of hemicellulose, cellulose and lignin are residual percentages (%) of these components with respect to the material bagasse, d.s.b., after the alkaline treatment.

As is evident from the results in Table 1, sodium hydroxide which is conventionally used tends to moderately lower the pH as compared with calcium oxide. As to the changes of components of bagasse, it was found that sodium hydroxide was more effective in decomposing and degrading cellulose and hemicellulose which are important ingredients as roughage.

It was also found that the products produced with calcium oxide are free of substantial decomposition of cellulose and hemicellulose and advantageously used as feed materials. All the products showed a satisfactory flexibility.

Based on these results, it was revealed that calcium oxide is advantageously used as an alkaline reagent to produce alkali-treated wastes of agricultural products.

EXPERIMENT 2
Effect of Combination of Calcium Oxide and Sodium Hydroxide on Alkaline Treatment A bagasse was tested as a waste of agricultural product. In accordance with the method in Experiment 1, the bagasse was mixed with water to give a water content of 70%, then mixed with calcium oxide in an amount of 2% or 3% of the bagasse, d.s.b., and sodium hydroxide in an amount of 1%, 2% or 4% of the bagasse, d.s.b. The resulting alkali-treated bagasse was studied on the changes of pH, components and flexibility. The results are shown in Table 2.

As is evident from the results in Table 2, it was found unexpectedly that the combination of calcium oxide and sodium hydroxide as alkaline reagents showed an advantageous feature similarly as in Experiment 1 using calcium oxide alone, i.e. there was no substantial loss of cellulose and hemicellulose in every bagasse tested similarly as in the case of using calcium oxide alone, and the resultant alkali-treated bagasse showed a sufficient flexibility. Thus the combination is satisfactory.

These results showed that the incorporation of sodium hydroxide as an alkaline reagent into wastes of agricultural products in an amount of less than the amount of calcium oxide substantially prevents the decomposition of cellulose and hemicellulose as effective ingredients for feeds and accelerates the decomposition of lignin to produce alkali-treated wastes of agricultural products with a satisfactory flexibility and quality.

EXPERIMENT 3
Influence of Plant Concentrate Material on the pH Reduction of Alkali-treated Waste of Agricultural Product Each alkali-treated waste of agricultural product with 24-hour alkaline treatment, obtained by the method in Experiment 2, was mixed with plant concentrate materials, and the mixing ratios and the levels of pH reduction were determined or measured: An alkali-treated waste of agricultural product was mixed with pressed wheat, rice bran, wheat bran or defatted soybean in an amount of 10%, 20%, 40% or 100% of the waste, d.s.b., followed by mixing the resulting mixture with an equal amount of water, and measuring the pH by the method in Experiment 1. The difference between the pHs of the alkali-treated waste before and after

TABLE 2

| Alkaline reagent (%) | | | O | 24 | | | | | 48 | | | | |
|---|---|---|---|---|---|---|---|---|---|---|---|---|---|
| CaO | NaOH | | pH | pH | HC | C | L | F | pH | HC | C | L | F |
| 2 | 1 | | 10.8 | 9.4 | 99.4 | 99.5 | 79.7 | Good | 9.0 | 98.5 | 99.1 | 78.3 | Good |
| | 2 | | 11.1 | 10.3 | 99.1 | 99.3 | 77.0 | Good | 9.6 | 98.2 | 98.4 | 75.0 | Good |
| | 4 | | 12.0 | 11.3 | 78.6 | 95.4 | 73.4 | Good | 10.4 | 76.6 | 93.5 | 70.2 | Good |
| 3 | 1 | | 11.0 | 10.1 | 98.5 | 99.3 | 77.4 | Good | 9.1 | 97.2 | 99.2 | 76.2 | Good |
| | 2 | | 11.6 | 10.4 | 98.2 | 98.1 | 75.0 | Good | 9.7 | 97.1 | 99.1 | 74.3 | Good |
| | 4 | | 12.0 | 11.3 | 74.6 | 92.4 | 72.2 | Good | 10.4 | 72.5 | 90.2 | 68.7 | Good |

Note: In Table 2, the symbol "HC" means hemicellulose; "C", cellulose; "L", lignin; and "F", flexibility. The values in "HC", "C" and "L" mean residual percentages (%) of their contents with respect to the material bagasse after the alkaline treatment.

mixing with a plant concentrate material and water was determined, and the mean value of the lowered pH of each plant concentrate material was calculated. The results were tabulated in Table 3.

TABLE 3

| Plant concentrate material | Mean value of lowered pH Percentage of plant concentrate material with respect to alkali-treated waste of agricultural product (% by weight) | | | |
| --- | --- | --- | --- | --- |
| | 10 | 20 | 40 | 100 |
| Pressed barley | 0.3 | 0.6 | 1.1 | 1.9 |
| Rice bran | 0.4 | 0.7 | 1.3 | 2.0 |
| Wheat bran | 0.3 | 0.6 | 1.1 | 1.9 |
| Defatted soybean | 0.6 | 1.1 | 1.5 | 2.2 |

As is evident from the results in Table 3, varying slightly depending on the types of plant concentrate materials used, the materials are usually suitably incorporated into alkali-treated wastes of agricultural materials in an amount of 20%, preferably, in an amount of over 40% of the alkali-treated wastes, d.s.b., to lower the pH of the alkali-treated wastes with pH 10.6 to a pH of below 10, preferably about 9.6, where lactic acid bacteria of the genus Enterococcus can grow.

The present process is advantageously used to produce fermented feeds because it facilitates the inoculation and fermentation of lactic acid bacteria by incorporating plant concentrate materials into alkali-treated wastes of agricultural products with a pH over 10, where most lactic acid bacteria cannot effectively grow, to lower the pH to a level where the bacteria can grow, effectively shortens the production period of fermented feeds, and greatly increases the nutritive value of the fermented feeds.

The following examples illustrate the present quick-fermented feeds prepared from alkali-treated wastes of agricultural products and plant concentrate materials, but they are by no means limitative of the present invention:

EXAMPLE 1

A bagasse was mixed with water to give a water content of about 70%, then further mixed with 4% calcium oxide and 1% sodium hydroxide with respect to bagasse, d.s.b., and the mixture was allowed to stand overnight to obtain an alkali-treated bagasse with a pH of about 10.5. To 100 parts by weight of the alkali-treated bagasse were added 15 parts by weight of wheat bran, 10 parts by weight of a low grade flour, 5 parts by weight of defatted soybean, 0.2 parts by weight of urea, 0.2 parts by weight of salt, and 30 parts by weight of water to lower the pH of the mixture to a pH less than 9.7, followed by inoculating a seed culture of *Enterococcus faecium* HL-5 (FERM BP-4504) to the mixture, covering the resulting mixture with a plastic sheet, and fermenting the mixture at ambient temperature for 2 days to obtain a quick-fermented feed.

The product, having a satisfactory taste and a considerably high quality, is suitably used as a feed for ruminants, and can be mixed with other nutrients to improve the nutritive value or prepared into feeds for animals with simple stomach such as pigs and poultry.

EXAMPLE 2

A bagasse was mixed with water to give a water content of about 70%, then mixed with 4% sodium hydroxide with respect to the bagasse, d.s.b., and the mixture was allowed to stand overnight to obtain an alkali-treated bagasse with a pH of about 10.6. To 100 parts by weight of the alkali-treated bagasse were added 20 parts by weight of pressed corn, 5 parts by weight of wheat bran, 5 parts by weight of a low grade flour, 0.2 parts by weight of urea, and 30 parts by weight of water to lower the pH of the mixture to a level below 9.7, followed by inoculating a seed culture of *Enterococcus faecium* HL-5 (FERM BP-4504) into the mixture, and fermenting the resulting mixture similarly as in Example 1 to obtain a quick-fermented feed.

The product, having a satisfactory taste and a considerably high quality, is suitably used as a feed for ruminants, and can be mixed with other nutrients to improve the nutritive value or prepared into feeds for animals with a simple stomach such as pigs and poultry.

EXAMPLE 3

A bagasse was mixed with water to give a water content of about 60%, then mixed with as alkaline reagents 6% calcium hydroxide and 2% sodium hydroxide with respect to the bagasse, d.s.b., and the mixture was allowed to stand overnight to obtain an alkali-treated bagasse with a pH of about 10.7. To 100 parts by weight of the alkali-treated bagasse were added 20 parts by weight of wheat bran, 10 parts by weight of defatted soybean, 10 parts by weight of molasses, 0.2 parts by weight of ammonium phosphate, and 50 parts by weight of water to lower the pH of the mixture to a level below 9.7, followed by inoculating seed cultures of *Enterococcus casseliflavus* (IFO 3531) and *Lactobacillus plantarum* (IFO 3070) into the mixture, and fermenting the resulting mixture similarly as in Example 1 to obtain a quick-fermented feed.

The product, having a satisfactory taste and a considerably high quality, is suitably used as a feed for ruminants, and can be mixed with other nutrients to improve the nutritive value or prepared into feeds for animals with simple stomach such as pigs and poultry.

EXAMPLE 4

A bagasse was mixed with water to give a water content of about 47%, then mixed with as alkaline reagents 4% calcium oxide and 2% sodium hydroxide with respect to the bagasse, d.s.b., and the mixture was allowed to stand overnight to obtain an alkali-treated bagasse with a pH of about 10.6. To 100 parts by weight of the alkali-treated bagasse were added 10 parts by weight of wheat bran, 10 parts by weight of defatted soybean, 5 parts by weight of corn gluten meal, 10 parts by weight of molasses, 0.2 parts by weight of ammonium sulfate, and 60 parts by weight of water to lower the pH of the mixture to a level below 9.7, followed by inoculating seed cultures of *Enterococcus faecalis* (IFO 3791) and *Lactobacillus brevis* (IFO 3345) into the mixture, injecting the resulting mixture into a flexible bag, and fermenting the mixture for 2 days at ambient temperature to obtain a quick-fermented feed.

The product, having a satisfactory taste and a considerably high quality, is suitably used as a feed for ruminants, and can be mixed with other nutrients to improve the nutritive value or prepared into feeds for animals with simple stomach such as pigs and poultry.

EXAMPLE 5

Bagasse was mixed with water to give a water content of about 45%, then mixed with alkaline reagents 2.5% calcium oxide and 2.5% sodium hydroxide with respect to the bagasse, d.s.b., and the mixture was allowed to stand overnight to obtain an alkali-treated bagasse with a pH of about 10.8. To 100 parts by weight of the alkali-treated bagasse were added 20 parts by weight of wheat bran, 5 parts by weight of pressed barley, 5 parts by weight of defatted rice bran, 10 parts by weight of molasses, 5 parts by weight of whey, and 70 parts by weight of water to lower the pH of the mixture to a level below 9.7, followed by inoculating seed cultures of *Enterococcus faecium* (FERM BP-4504), *Lactobacillus rhamnosus* (IFO 3532) and *Lactobacillus acidophilus* (IFO 13952) into the mixture, injecting the resulting mixture into a flexible bag, and fermenting the mixture for 3 days at ambient temperature to obtain a quick-fermented feed.

The product, having a satisfactory taste preference and a considerably high quality, is suitably used as a feed for ruminants, and can be mixed with other nutrients to improve the nutritive value or prepared into feeds for animals with a simple stomach such as pigs and poultry.

EXAMPLE 6

A quick-fermented bagasse obtained by the method in Example 4 was dried by hot air to obtain a dried quick-fermented feed with a moisture content of about 20%.

The product, having a relatively high digestibility and a considerably good taste and quality, has a satisfactory shelf-life and transportability over a great distance.

EXAMPLE 7

Ears and stems of corn were mixed with water to give a water content of about 50%, then mixed with 2.5% calcium oxide and 2.5% sodium hydroxide with respect to the bagasse, d.s.b., and the mixture was allowed to stand overnight to obtain an alkali-treated product with a pH of about 10.5. To 100 parts by weight of the product were added 20 parts by weight of pressed barley, 15 parts by weight of rapeseed meal, 10 parts by weight of wheat bran, 5 parts by weight of a low grade flour, and 66 parts by weight of water to lower the pH of the mixture to a level below 9.7, followed by inoculating seed cultures of *Enterococcus faecium* (FERM BP-4504) and *Lactobacillus rhamnosus* (IFO 3532) into the mixture, injecting the resulting mixture into a flexible bag, and fermenting the mixture for 2 days at ambient temperature to obtain a quick-fermented feed.

The product, having a satisfactory taste and a considerably high quality, is suitably used as a feed for ruminants, and can be mixed with other nutrients to improve the nutritive value or prepared into feeds for animals with simple stomach such as pigs and poultry.

EXAMPLE 8

Stems of koaliang were mixed with water to give a water content of about 50%, then mixed with 3% calcium oxide and 2% sodium hydroxide with respect to the koaliang, d.s.b., and the mixture was allowed to stand overnight to obtain an alkali-treated product with a pH of about 10.6. To 100 parts by weight of the product were added 15 parts by weight of wheat bran, 5 parts by weight of a low grade flour, 10 parts by weight of pressed corn, 10 parts by weight of defatted soybean, 0.2 parts by weight of feather meal, and 45 parts by weight of water to lower the pH of the mixture to a level below 9.7, followed by inoculating seed cultures of *Enterococcus faecium* (FERM BP-4504) into the mixture, covering the mixture with a plastic sheet, and fermenting the resulting mixture for 2 days at ambient temperature to obtain a quick-fermented feed.

The product, having a satisfactory taste and a considerably high quality, is suitably used as a feed for ruminants, and can be mixed with other nutrients to improve the nutritive value or prepared into feeds for animals with simple stomach such as pigs and poultry.

EXAMPLE 9

Wheat straws were mixed with water to give a water content of about 50%, then mixed with 5% calcium oxide and 1% sodium hydroxide with respect to the bagasse, d.s.b., and the mixture was allowed to stand overnight to obtain an alkali-treated product with a pH of about 10.8. To 100 parts by weight of the alkali-treated product were added 15 parts by weight of pressed koaliang, 5 parts by weight of wheat bran, 10 parts by weight of defatted soybean, 10 parts by weight of molasses, 0.2 parts by weight of urea, 0.1 part by weight of powdered bones, and 40 parts by weight of water to lower the pH of the mixture to a level below 9.7, followed by inoculating a seed culture of *Enterococcus faecium* (FERM BP-4504) into the mixture, covering the resulting mixture with a plastic sheet, and fermenting the mixture for 2 days at ambient temperature to obtain a quick-fermented feed.

The product, having a satisfactory taste and a considerably high quality, is suitably used as a feed for ruminants, and can be mixed with other nutrients to improve the nutritive value or prepared into feeds for animals with simple stomach such as pigs and poultry.

EXAMPLE 10

A mixture of rice hulls and barley straws (=3:1 by weight) was admixed with water to give a water content of about 50%, then mixed with as alkaline reagents 4.3% calcium oxide and 2.2% sodium hydroxide with respect to the mixture, d.s.b. The resulting mixture was allowed to stand overnight to obtain an alkali-treated product with a pH of about 11.0. To 40 parts by weight of the alkali-treated product were added 40 parts by weight of pressed corn, 30 parts by weight of pressed barley, 16 parts by weight of wheat bran, 6 parts by weight of defatted rice bran, 10 parts by weight of molasses, and 90 parts by weight of water to lower the pH of the mixture to a level below 9.7, followed by inoculating into the mixture seed cultures of *Enterococcus faecium* (FERM BP-4504), *Lactobacillus rhamnosus* (IFO 3532) and *Lactobacillus acidophilus* (IFO 13952), injecting the resulting mixture into a flexible bag, and fermenting the mixture for 2 days at ambient temperature to obtain a quick-fermented feed.

The product, having a satisfactory taste and a considerably high quality, is suitably used as a feed for ruminants, and can be mixed with other nutrients to improve the nutritive value or prepared into feeds for animals with a simple stomach such as pigs and poultry.

EXAMPLE 11

Twenty cattle weighing 400–500 kg were fed for 60 days with a quick-fermented feed obtained by the method in Example 4. They had about 20–25 kg/day of the feed by preference, showed a satisfactory health condition and growth, and gained about 2.1 kg/day/head on an average.

As is described above, the present invention facilitates the production of high quality quick-fermented feeds with a satisfactory digestibility and taste preference by incorporating plant concentrate materials into alkali-treated wastes of agricultural products to lower the pH to a level below 10, preferably, to a level below 9.7, inoculating lactic acid bacteria into the mixture, and fermenting the resulting mixture.

The present invention will influence the fields of feeds and livestock processing. Farmers and processors of agricultural products who are troubled about the treatment of wastes, and stock farmers who are anxious about the shortage of feeds will benefit from the present invention. With a global view point on this, the use of the wastes of agricultural products, as an untouched biomass produced yearly in quantities, does not compete with food products for humans. On the contrary, the present invention provides meat and milk products for humans from these biomass on an industrial scale. Therefore, it is impossible to exaggerate that the present invention established a novel technology that saves the future of the earth suffering from troublesome environmental destruction, population explosion, and food crisis. Thus the influence of the present invention is unfathomable.

While there has been described what is at present considered to be the preferred embodiments of the invention, it will be understood the various modifications may be made therein, and it is intended to cover in the appended claims all such modifications as fall within the true spirit and scope of the invention.

We claim:

1. A quick-fermented feed which is capable of being prepared within about 2–4 days and which is prepared by a process comprising the following steps:
   (a) softening agricultural product waste with calcium oxide and optionally sodium hydroxide in an amount less than the amount of calcium oxide, while preventing decomposition of cellulose and hemicellulose, to obtain an alkali-treated agricultural product waste having a pH of 10.5–12;
   (b) adding to said alkali-treated agricultural product waste a plant concentrate material to lower the pH of said alkali-treated agricultural product waste to a level of more than 7 but below 9.7, said plant concentrate material being selected from the group consisting of crushed cereals, brans of cereals, lees of cereals, and mixtures thereof, wherein said plant concentrate material is incorporated into said alkali-treated agricultural product waste in an amount of at least 20 w/w % of said alkali-treated waste agricultural product waste on a dry solids basis;
   (c) inoculating the product of step (b) with a lactic acid bacterium, said bacterium being capable of growing at a pH of 9.5 or more in a nutrient culture medium or in a 6.5 w/w % sodium chloride solution; and
   (d) fermenting the product from step (c) for about 2–4 days at 15–50° C. under anaerobic conditions.

2. The quick-fermented feed according to claim 1, wherein the lactic acid bacterium is a lactic acid bacterium of the genus Enterococcus optionally with at least one additional lactic acid bacterium selected from the group consisting of the genera Lactobacillus, Pediococcus, and Streptococcus.

3. The quick-fermented feed according to claim 2, wherein said lactic acid bacterium of the genus Enterococcus is *Enterococcus faecium* HL-5 (FERM BP-4504).

4. In a method for feeding livestock, the improvement comprising feeding livestock with said quick-fermented feed of claim 1.

5. A process for preparing a quick-fermented feed which is capable of being prepared within about 2–4 days comprising the following steps:
   (a) softening agricultural product waste with calcium oxide and optionally sodium hydroxide in an amount less than the amount of calcium oxide, while preventing decomposition of cellulose and hemicellulose, to obtain an alkali- treated agricultural product waste having a pH of 10.5–12;
   (b) adding to said alkali-treated agricultural product waste a plant concentrate material to lower the pH of said alkali-treated agricultural product waste to a level of more than 7 but below 9.7, said plant concentrate material being selected from the group consisting of crushed cereals, brans of cereals, lees of cereals, and mixtures thereof, wherein said plant concentrate material is incorporated into said alkali-treated agricultural product waste in an amount of at least 20 w/w % of said alkali-treated agricultural product waste on a dry solids basis;
   (c) inoculating the product of step (b) with a lactic acid bacterium, said bacterium being capable of growing at a pH of 9.5 or more in a nutrient culture medium or in a 6.5 w/w % sodium chloride solution;
   (d) fermenting the product from step (c) for about 2–4 days at 15–50° C. under anaerobic conditions to produce a quick-fermented feed; and
   (e) recovering said quick-fermented feed.

6. The process according to claim 5 wherein the lactic acid bacterium is a lactic acid bacterium of the genus Enterococcus optionally with at least one additional lactic acid bacterium selected from the group consisting of the genera Lactobacillus, Pediococcus, and Streptococcus.

7. The process according to claim 6 wherein said lactic acid bacterium of the genus Enterococcus is *Enterococcus faecium* HL-5 (FERM BP-4504).

8. The process according to claim 6 wherein said lactic acid bacteria of the genera Lactobacillus, Pediococcus, and Streptococcus grow at a pH below about 8.

9. The process according to claim 5 wherein said quick-fermented feed is a feed for ruminants and optionally for other animals with a simple stomach.

* * * * *

UNITED STATES PATENT AND TRADEMARK OFFICE
CERTIFICATE OF CORRECTION

PATENT NO. : 6,077,546
DATED : June 20, 2000
INVENTOR(S) : Satoshi Iritani, et al.

It is certified that error appears in the above-identified patent and that said Letters Patent is hereby corrected as shown below:

On the title page, item [73] Assignee, should read--

Kabushiki Kaisha Hayashibara Seibutsu, Kagaki Kenkyujo--

Signed and Sealed this

Fourteenth Day of November, 2000

Attest:

Q. TODD DICKINSON

*Attesting Officer*      *Director of Patents and Trademarks*